United States Patent Office 2,760,187
Patented Aug. 21, 1956

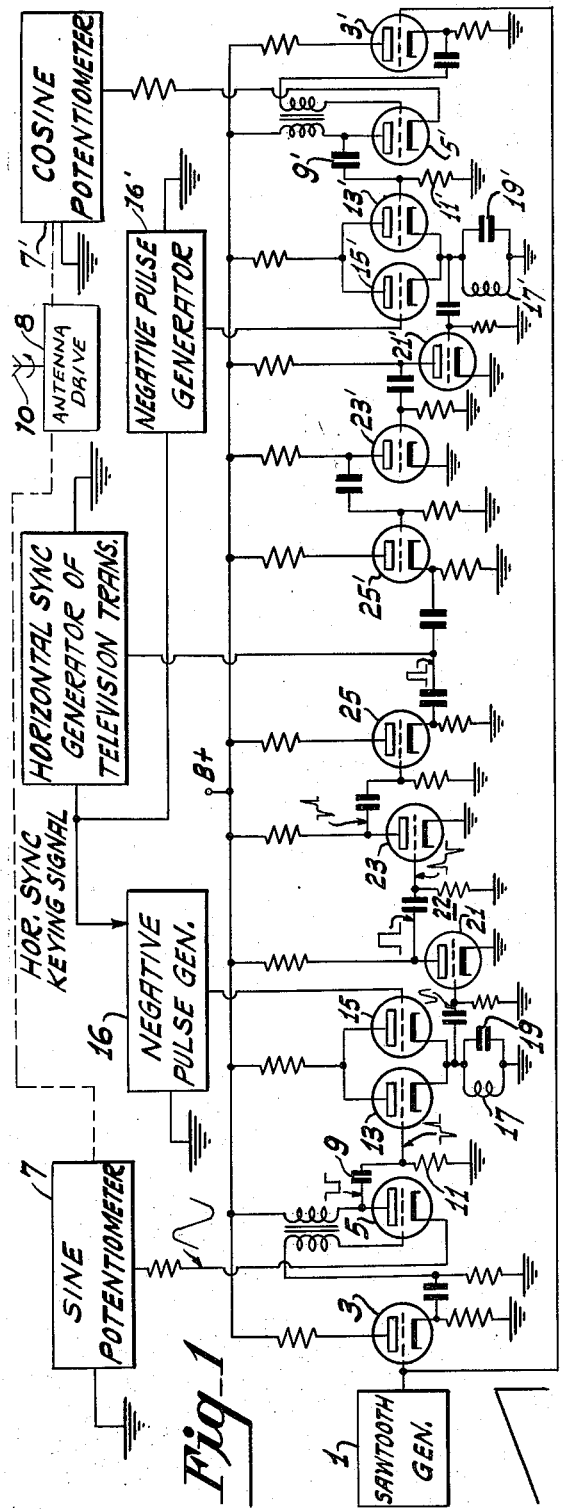

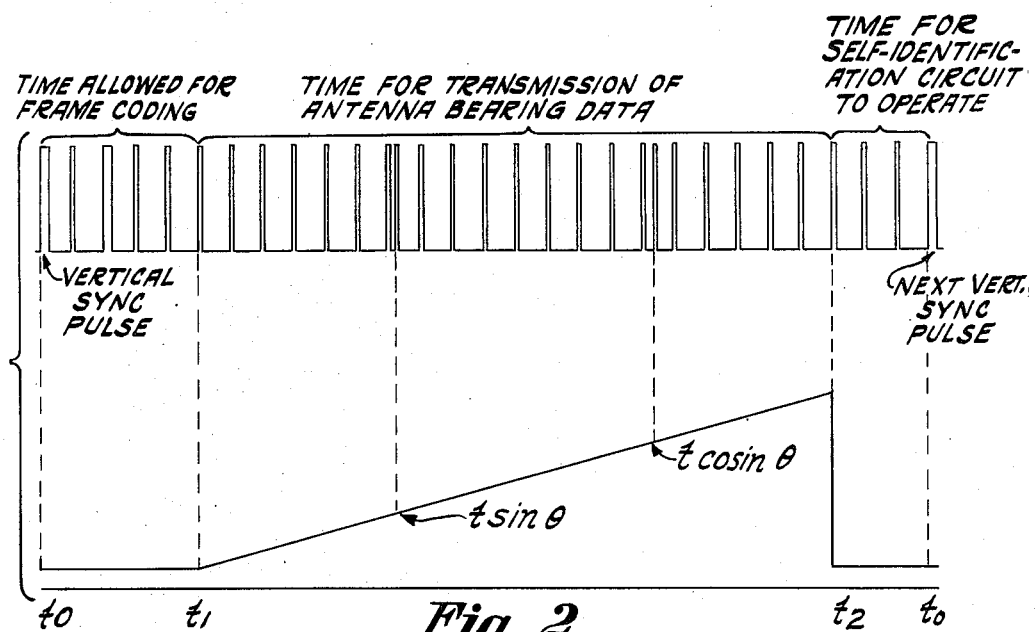
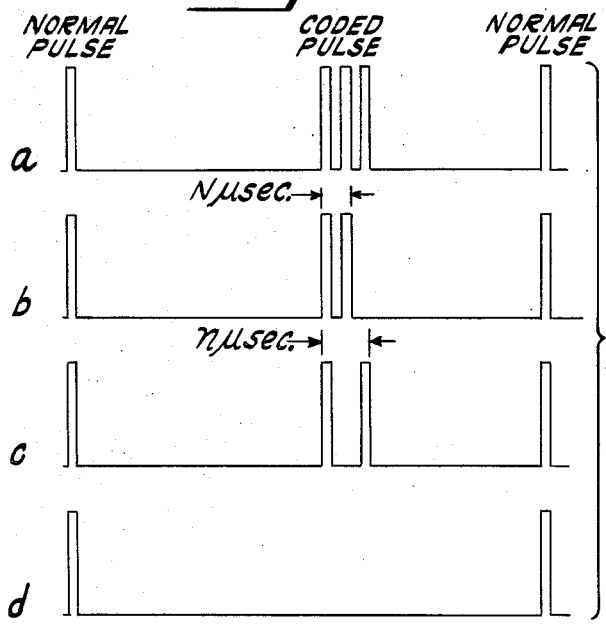

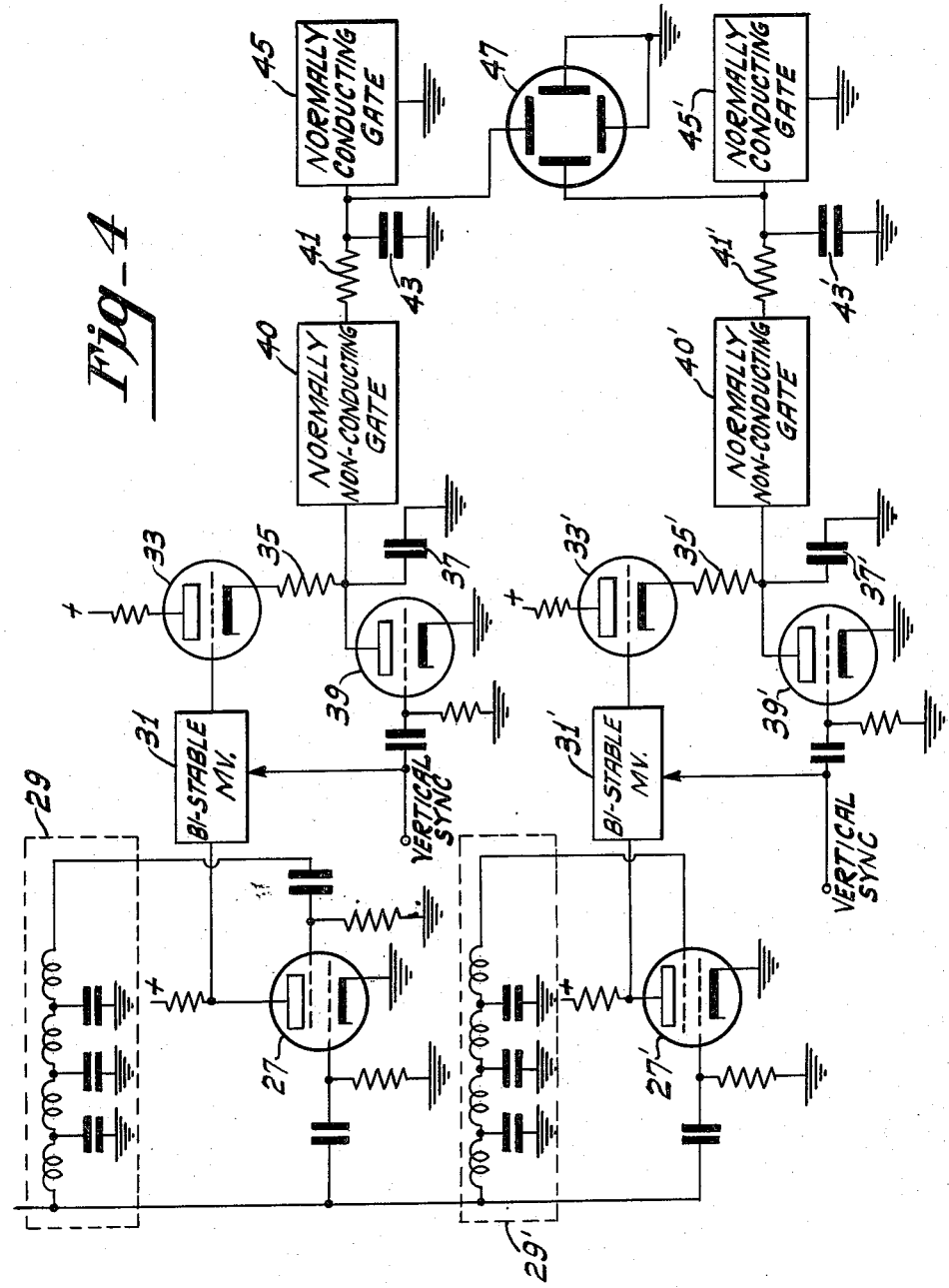

2,760,187

SELF-IDENTIFICATION RADAR SYSTEM

Arthur C. Stocker, Collingswood, N. J., assignor, by mesne assignments, to the United States of America as represented by the Secretary of the Air Force Application March 1, 1951, Serial No. 213,314

7 Claims. (Cl. 343—6)

This invention relates to radio navigation systems and particularly to systems for ship or aircraft navigation wherein the ship or aircraft receives navigational information from a central control station.

Teleran or pictorial display navigation systems include a PPI (plan position indicator) radar system and a television transmitter located at the control station, for transmitting the pictorial radar display to ships or aircraft in the service area of the PPI radar control station. Each ship or aircraft carries a television receiver and a radar reply beacon (transponder).

The pictorial display received by the television receivers located on the various aircraft, serviced by the control station, shows the location of the aircraft in the service area of the control transmitting station, but does not identify the aircraft individually with respect to each other or with respect to the control station.

Various methods and means may be employed in accomplishing aircraft self-identification. In U. S. Patent No. 2,528,202 granted to Irving Wolff on October 31, 1950, a method is described wherein a strobe, or marker, line rotates in synchronism with the ground station radar antenna. A receiver on a given aircraft receives a group of interrogating pulses, and integrates them. The single integrated pulse is applied to the control grid of a television receiver cathode ray tube thereby brightening the picture during the interrogation period.

In a copending application Serial No. 607,999½ filed July 31, 1945, now U. S. Patent No. 2,632,157, Loren F. Jones discloses a self-identification system whereby an aircraft or ship navigator may, when he desires to identify his position, increase the power output of a reply pulse to ground radar beacon interrogation. The increased signal strength received at the interrogating station is greater and hence the corresponding PPI spot corresponding to his aircraft is of increased intensity. Thus the navigator may ascertain his position, designated by a relatively brighter PPI spot, relative to all other craft in the service area by merely viewing the televised PPI display.

In accordance with the instant invention self-identification is accomplished by transmitting information, from the control station to the aircraft, relating to the instantaneous directional characteristic of the ground radar antenna. The information may be used, on the aircraft, to provide a strobe line through the PPI spot in the received television picture corresponding to said aircraft.

An object of the invention is to provide an improved radar navigation system providing more efficient self-identification of radar targets.

Another object of the invention is to provide an improved radar system for self-identification of a plurality of aircraft or ships within a given service area.

A typical system in accordance with the present invention includes, on the ground, a plan position indicator radar system and a television transmitter for transmitting the PPI display to, for example, a plurality of aircraft within the service range of the system. Usually it is desirable that a map be superimposed on the PPI display so that the resulting composite picture is transmitted by the television transmitter. The plurality of aircraft carry television receivers and preferably radar reply beacons (transponders).

The ground radar station radiates radio pulses from a directional antenna that is continuously rotated through 360° to search for aircraft within its service area. A cathode ray indicator tube is provided with a deflecting yoke that is rotated in synchronism with the antenna, and the cathode ray is simultaneously deflected radially at a comparatively rapid rate in synchronism with the pulse transmission. Thus the cathode ray scans in polar co-ordinates. Radio pulses reflected from the aircraft or retransmitted from the transponders of the plurality of aircraft are picked up by the radar antenna and are caused to modulate the cathode ray. Thus there appears on the cathode ray indicator a radar display wherein a spot on the cathode ray screen corresponds to a particular aircraft and the craft's position with respect to the radar antenna is shown.

The composite PPI picture is transmitted by a television transmitter so that it may be received by any aircraft equipped with a television receiver within the service area. Since the PPI display may show a plurality of craft in the service area, some identification method or means must be provided enabling a navigator to determine which one of the spots in the display he is viewing is the one corresponding to his craft.

Self-identification signals, according to the present invention, are derived by coding a pair of horizontal synchronizing pulses in the television transmitting system. One pulse is coded indicating the sine function of the instantaneous directional characteristic of the radar antenna. A second pulse may similarly be coded to transmit cosine data. At the aircraft, the coded horizontal synchronizing pulses are received by a television receiver and cause a pair of capacitors to charge to voltages proportional to said sine and cosine functions of said radar antenna instantaneous bearing. These voltages upon interrogation of the aircraft by the ground PPI radar signals are gated and preferably deflect a storage tube writing beam radially, the angle of deflection indicating the bearing of the aircraft in relation to the control station.

The invention will be described in greater detail with reference to the accompanying drawings of which Figure 1 is a schematic circuit diagram, according to the invention, of transmitter generator means for coding television system horizontal synchronizing pulses; Figure 2 is a wave diagram illustrating a particular pulse code as related to Fig. 1; Figure 3 is a diagram of typical horizontal synchronizing pulse codes; Figure 4 is a schematic circuit diagram of a first embodiment of aircraft equipment, according to the invention, for interpreting a particular sine and cosine information code; and Figures 5 and 6 are schematic block diagrams of other embodiments of decoding means differing from the decoding means employed in the circuitry of Figure 4.

Sine generator

Referring to Figure 1 of the drawing, at the transmitter, a rising sawtooth voltage is developed in a sawtooth generator 1 and is coupled to the grid of a cathode follower 3. The period of the sawtooth voltage, referring to Fig. 2, is equal to the time for transmission of sine and cosine antenna information for one field of the television picture. The output from the cathode follower 3 is coupled to the grid electrode of a normally non-conducting square wave generator 5. The cathode of the square wave generator 5 is connected to a sine potentiometer 7, the structure of which is described on pg. 284, volume 17 of the M. I. T. Radiation Laboratory Series. The potentiometer 7 is coupled to an antenna drive 8 which drives a directional antenna 10 and is constructed so that the voltage derived therefrom is proportional to the sine of $\theta$, where $\theta$ is the instantaneous PPI radar system antenna angle. For a given direction of the radar antenna 10 the normally non-conducting square wave generator 5 conducts as the magnitude of the sawtooth voltage coupled from the cathode follower 3 becomes greater than the magnitude of the voltage derived from the sine potentiometer 7. The generator 5 is biased such that its anode current rises rapidly from zero to a maximum value producing a substantially square wave output from the tube 5.

A capacitor 9 and a resistor 11 are serially connected between the anode of the generator 5 and a common ground connection thereby comprising a network which differentiates the square wave pulse and applies it to the grid of one 13 of two triodes 13, 15 of a ringing circuit in which their respective anodes and cathodes are commonly connected. The differentiated pulse applied to the grid of said vacuum tube 13 is sufficient to cut off the tube 13 for a period of time slightly longer than the time interval between any successive pair of television system horizontal synchronizing pulses.

The cathode circuit of the ringing circuit includes a parallel-connected inductor 17 and capacitor 19. A negative pulse, coupled from an external negative pulse generator 16 cuts off the remaining ringing circuit triode 15. The generator 16 is preferably keyed by the television system horizontal synchronizing generator and is of duration sufficient for the resonant circuit to oscillate for one cycle. The output signal from the tuned circuit 17, 19 cuts off a second square wave generator 21 substantially producing a square wave output pulse in its anode circuit. The latter pulse is differentiated by a second differentiating network 22 and thence coupled to an amplifier 23. The output from the amplifier 23 is coupled to a cathode follower 25 which is biased to reject the negative portion of the amplified differentiated pulse and which flattens the top of the positive portion. The resulting pulse is introduced into the television system synchronizing system, thereby effectively coding one of the pulses of the horizontal field by the addition of this new pulse. The time interval between said horizontal synchronizing pulse and its coding pulse is, for sine function data, N microseconds, where 2N is the period of the ringing circuit 17, 19.

*Cosine generator*

Another circuit, having components designated by primes, similarly is used to transmit antenna angle cosine data. Timing of the application of the negative pulse to the second 15' of the ringing circuit triodes 13', 15' effectively permits the time delay between a vertical sync pulse and the coded horizontal sync pulse to vary as the cosine of the radar antenna angle. The period of the ringing circuit is such that the time delay between the horizontal sync pulse and its coding pulse, for cosine data, to be $n$ mircroseconds. Reference Figure 3 illustrates typical pulse codes which may be used. The embodiment herein described employs codes illustrated by Figs. 3–b and 3–c for sine and cosine data respectively.

*Vehicle equipment*

At the aircraft, referring to Figure 4 of the drawing, the synchronizing pulses transmitted by the control station television transmitter are received and are coupled to a pair of normally non-conducting multigrid gating tubes 27, 27'. An N microsecond time delay line 29 connected to one of the gates 27 and an $n$ microsecond time delay line 29' connected to the remaining multigrid gating tube 27' separates the sine and cosine angle information by the respective delay line 29 or 29' delaying the first pulse of the two-pulse group sufficiently that the delayed first pulse and the undelayed second pulse are coincidently applied to the appropriate gating tube 27 or 27' providing an output pulse therefrom.

In the channel for obtaining sine angle data, the output pulse from its associated gating tube 27 is coupled to a bi-stable multivibrator 31 of the Eccles-Jordan type. The multivibrator 31 is originally "set" by a vertical synchronizing pulse which causes a positive pulse output from the multivibrator 31 and initiates conduction in a normally non-conducting triode 33. A resistor 35 is connected to the cathode of the triode 33 and a capacitor 37 is serially connected with the resistor 35 to a common ground connection. Upon conduction of the triode 33 the capacitor 37 charges, the charge current being limited by the cathode resistor 35, until the output pulse from the gating tube 27 is applied to and reverses the polarity of the multivibrator 31. With the polarity reversed the charge current ceases and the capacitor 37 maintains its charge until the next vertical synchronizing pulse discharges the capacitor 37 through another triode 39 and simultaneously resets the multivibrator 31.

Thus the capacitor 37 is charged to a voltage proportional to the sine function of the antenna angle of the PPI radar system. The capacitor 37, a normally non-conducting gate 40, a resistor 41, and a second capacitor 43 are connected, in the order named, completing a loop circuit. Interrogation of the aircraft by the ground station transmitter portion of the radar system results in an output from the airborne receiver 26 which causes a normally conducting gate 45 to cut-off and said normally non-conducting gate 40 conducts. The capacitor 43 charges through the resistor 41 and through the now conducting gate 40 until the second capacitor 43 shares the charge of the first capacitor 37 which originally was charged to a voltage proportional to the sine of the PPI system antenna angle. Similar circuitry is utilized, designated by primes, in charging a second capacitor 43' to a voltage proportional to the cosine of the radar antenna angle.

The derived proportional voltages may then be applied to deflect the writing beam of a storage tube 47 accordingly. By proper selection of circuit component parts, the time constants for the sine and cosine decoding circuits are equal and $$\tan^{-1} \frac{e_{43}}{e_{43'}} = \tan^{-1} \frac{\sin \theta}{\cos \theta} = \tan^{-1} \tan \theta$$

and the electron beam is deflected in a straight radial line. It may be desirable to read the storage tube display with a raster scan and superimpose the storage tube picture on the PPI view effectively drawing a radial line through the PPI spot corresponding to the interrogated aircraft.

Reference Figure 5 discloses circuitry which may be used in Figure 4 to separate pulse codes of Figures 3a and 3c. Figure 6 illustrates a circuit for separating a code signal of Figure 3–d from all others.

In Figure 5 sine and cosine antenna data comprising two pulse and three pulse groups respectively are coupled to two step and three step threshold counters. The terms two and three step threshold counters are herein used to describe counters which pass only one output pulse in response to two (or three) pulses arriving in rapid succession but which do not count the relatively slow horizontal sync pulses. These counters are essentially as shown on pg. 603, vol. 19 of the M. I. T. Radiation Laboratory Series, with the addition of a resistor to discharge the capacitor between sync pulses. A two pulse group will actuate the two step counter 49 but will not actuate the three step counter 51. The output signal from two pulse counter 49 is delayed in a time delay network 53 and passed on to one of the two bi-stable multivibrators 31, 31' of Fig. 4 by a normally conducting gate 55. A three pulse group actuates the three step counter 51, however, the first two pulses of the group of three also actuates the two step counter 49. To suppress an undesired output therefrom the output from the two step counter 49 is delayed sufficiently so that it is applied to the gating tube 55 coincidently with the application of the output from the three step counter 51. The gating tube 55 cuts off and does not allow an erroneous output from the two-counter 49 to pass. The output from the three counter 51 is then coupled to one of the bistable multivibrators 31, 31', of Figure 4.

Figure 6 illustrates a code separating means in which a horizontal sync pulse is removed from the television sync pulse field. It is necessary both to obtain an output pulse as a result of the missing pulse and to replace the missing sync pulse. Horizontal synchronizing pulses are simultaneously coupled to a pulse adder and clipper 57, a time delay line 59, and a pulse stretcher 61. The time delay is sufficient to replace the missing sync pulse and the resulting output from the pulse adder is clipped to a standard level and coupled to television receiver synchronizing circuits. The horizontal synchronizing pulses coupled to the pulse stretcher 61 create an output pulse having a period equal to the longest period of any code group employed. Coincident application of the stretched sync pulse and pulses from the horizontal sync field permits no output from an anti-coincidence gating tube 63. When a pulse is missing from the sync field, however, the anticoincidence gate 63 conducts and produces an output pulse which may be coupled to one of said multivibrators 31, 31'.

In summation: means are disclosed modifying a pair of television system horizontal synchronizing pulse to include information of the bearing of a PPI radar system antenna; the pulses are received, separated, and are caused to charge a pair of capacitors to voltages proportional to the sine and cosine of said radar antenna; these voltages radially deflect a writing beam in a storage tube indicating the bearing of a radar antenna relative to an interrogated craft; and finally means are disclosed decoding several different pulse groups which may be used to carry antenna bearing information.

What is claimed is:

1. A system for self identifying the position of a given aircraft relative to the position of a control station and to the positions of a plurality of aircraft serviced by said control station, said system including at said control station, a radar system having a directional antenna and a television transmitter system, means for coding a plurality of synchronizing pulses of said television transmission system according to the instantaneous directional characteristic of said radar system antenna, means located at said given aircraft receiving said coded synchronizing pulses, means coupled to said receiving means for decoding said coded synchronizing pulses and means coupled to said decoding means responsive to radar interrogation of said given aircraft by said control station for utilizing the output of said decoding means for providing an indication of the relative bearing of said given aircraft.

2. A system for self identifying the position of a given aircraft relative to the position of a control station and to the positions of a plurality of aircraft serviced by said control station, said system including, at said control station, a radar system having a directional antenna and a television transmitter system, means for coding different horizontal synchronizing pulses of said television transmitting system according to the instantaneous sine and cosine functions of the angular orientation of said radar antenna, means for transmitting said coded synchronizing pulses to said plurality of aircraft, means located at said given aircraft for receiving said transmitted coded horizontal synchronizing pulses, means coupled to said receiving means for decoding said coded pulses, a pair of capacitors, means coupled to said decoding means for charging said pair of capacitors to voltages proportional to the sine and cosine functions of said antenna, visual display means, and means responsive to radar interrogation of said given aircraft by said control station radar system for applying said proportional voltages to said visual display means.

3. A system as described in claim 2 wherein said capacitor charging means includes a vacuum tube serially connected with one of said capacitors, current flow being initiated in said tube by a vertical synchronizing pulse from said television transmitting system and said vacuum tube current flow being cut off by one of said coded pulses.

4. A system for identifying the position of a given aircraft with respect to the position of a control station and to the positions of other aircraft serviced by said control station, said system including, at said control station, a radar system having a directional antenna and a television transmitter system, a sine wound potentiometer and a cosine wound potentiometer coupled to said directional antenna for providing separate output potentials proportional respectively to sine and cosine functions of the instantaneous azimuth position of said antenna, means coupled to said potentiometers for coding different pulses of said television transmitter system according to said functions, means for transmitting said coded pulses to said plurality of aircraft, means located at said given aircraft for receiving said transmitted coded pulses, means coupled to said receiving means for decoding said coded pulses, and means coupled to said decoding means responsive to radar interrogation of said given aircraft by said control station for utilizing the output of said decoding means for providing an indication of the relative bearing of said given aircraft.

5. A system for identifying the position of a given aircraft with respect to the positions of a control station and other aircraft serviced by said control station, said system including, at said control station, a radar system having a directional antenna and a television transmitter system, a sine wound potentiometer and a cosine wound potentiometer coupled to said directional antenna for providing separate output potentials proportional respectively to sine and cosine functions of the instantaneous azimuth position of said antenna, means coupled to said potentiometers for coding different synchronizing pulses of said television transmitting system according to said sine and cosine functions, means for transmitting said coded pulses to said plurality of aircraft, means located at said given aircraft for receiving said transmitted coded synchronizing pulses, means for separating a pulse coded with sine function data from a pulse coded with cosine function data, a pair of capacitors, and means coupled to said separating means for charging said capacitors to voltages proportional to said sine and cosine functions.

6. For use in a system for identifying the position of an aircraft relative to the position of a control station and to the positions of other aircraft serviced with electrical data by said control station; control station apparatus comprising, a radar transmission system including a directional antenna, a television transmission system, and means for coupling said directional antenna to said television transmission system for coding a plurality of synchronizing pulses of said television transmission system according to the instantaneous azimuth position of said directional antenna.

7. In a system for identifying the position of a given aircraft relative to the position of a control station and to the positions of other aircraft serviced with television and radar data by said control station; apparatus for use on board said given aircraft comprising, television receiving means for receiving television data transmitted by said control station including television synchronizing signals coded according to the instantaneous azimuth position of a radar antenna located at said control station, means coupled to said television receiving means for decoding said coded television system synchronizing pulses, a radar receiver responsive to control station interrogation of said given aircraft, and means coupling the outputs of said radar receiver and said decoding means for providing an indication of the bearing of said given aircraft with respect to said control station.

References Cited in the file of this patent

UNITED STATES PATENTS

| | | |
|---|---|---|
| 2,089,639 | Bedford | Aug. 10, 1937 |
| 2,448,016 | Busignies | Aug. 31, 1948 |
| 2,499,225 | Marshall | Feb. 28, 1950 |
| 2,517,752 | Wolff | Aug. 8, 1950 |
| 2,519,935 | Smith | Aug. 22, 1950 |
| 2,528,202 | Wolff | Oct. 31, 1950 |
| 2,539,905 | Herbst | Jan. 30, 1951 |
| 2,563,998 | Foster | Aug. 14, 1951 |
| 2,568,265 | Alvarez | Sept. 18, 1951 |